United States Patent
Hart et al.

[15] 3,664,305
[45] May 23, 1972

[54] EXTENDIBLE WATERING SYSTEM FOR FOWLS

[72] Inventors: Harold W. Hart; Warren H. Hart, both of Glendale, Calif.

[73] Assignee: H. W. Hart Mfg. Co., Glendale, Calif.

[22] Filed: Dec. 29, 1969

[21] Appl. No.: 888,594

[52] U.S. Cl. ............................................................... 119/72
[51] Int. Cl. ........................................................... A01k 07/00
[58] Field of Search ........................ 119/72, 74, 75, 76, 78, 79, 119/80, 81, 18

[56] References Cited

UNITED STATES PATENTS 2,849,020  8/1958  Goff ........................................ 119/81 X
2,879,743  3/1959  Hostetler ................................. 119/81

*Primary Examiner*—Hugh R. Chamblee
*Attorney*—Smyth, Roston & Pavitt

[57] ABSTRACT

A pipeline comprises plastic pipe lengths interconnected by plastic couplings with telescoped joints and with plastic valves in each coupling. The pipeline is enclosed and supported by an adjustably suspended sheet metal housing assembly with a charged wire thereon to keep off fowls.

36 Claims, 8 Drawing Figures

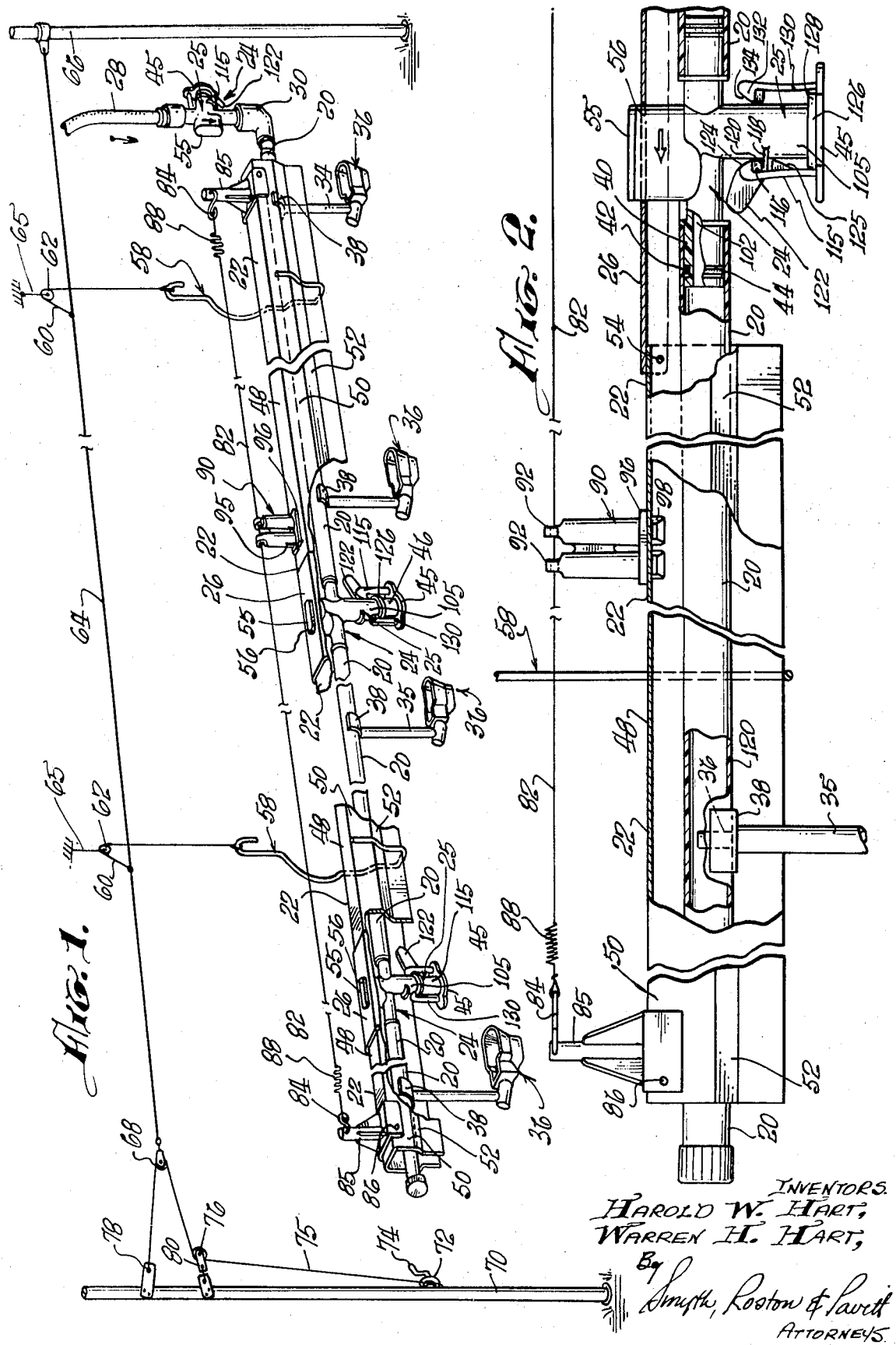

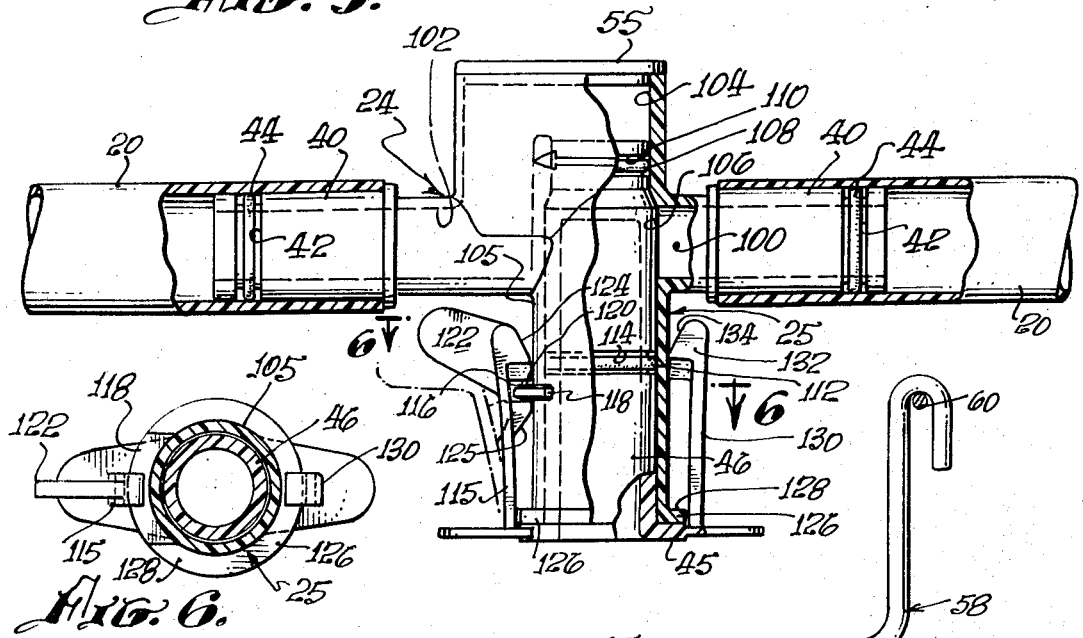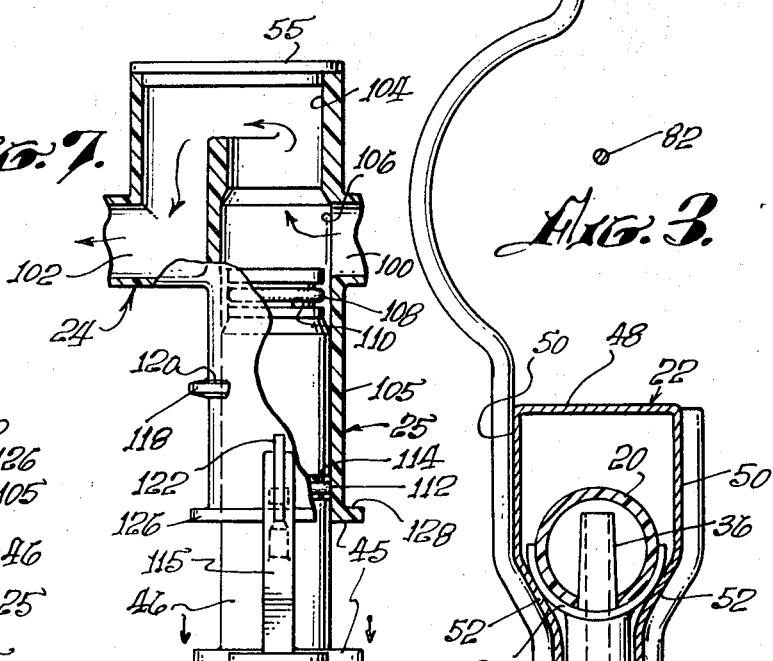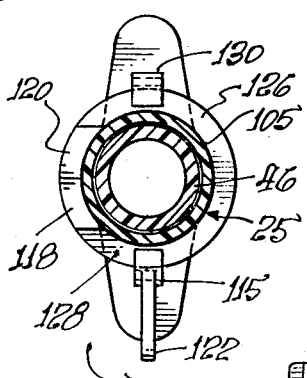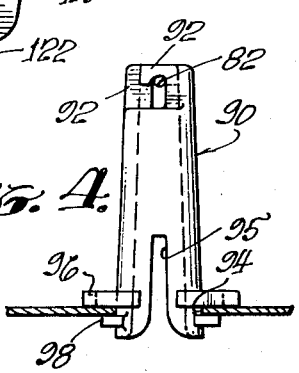

3,664,305

EXTENDIBLE WATERING SYSTEM FOR FOWLS

BACKGROUND OF THE INVENTION

Raising fowls profitably on a commercial scale involves the use of plastic pipelines, usually hundreds of feet long, equipped with numerous spaced drinking cups that dispense water in response to pecks by the fowls. Bearing in mind that low profit margins make it mandatory to minimize labor costs, such a water system should be capable of being easily and quickly installed and just as easily serviced and repaired when necessary. The watering cups must be capable of being periodically elevated in a time-saving manner as the birds mature. Above all, sanitary conditions must prevail at low maintenance cost, it being essential to keep the watering cups clean and to keep the fowls from perching on the pipeline. In addition, all exposed surfaces should be smooth and easily cleaned.

With further reference to sanitation, it is highly undesirable to lay the pipeline on the floor because it becomes an obstacle to freedom of movement on the part of the birds and, more important, because the underside of the pipeline forms crevices to trap food and foreign materials. It is further important that the drinking cups can sufficiently elevated to keep them from being fouled by the birds.

SUMMARY OF THE INVENTION

Water at a relatively low head is supplied to a pipeline that is made up of 10 foot sections of PVC pipe interconnected by plastic couplings, the opposite ends of the couplings simply telescoping into the pipe ends. The couplings carry O-rings to seal the joints effectively and with the aid of suitable lubricant the couplings may be quickly and easily installed.

The pipeline is both supported and enclosed by a corresponding housing assembly made up of ten foot sections of sheet metal of the cross-sectional configuration of inverted channels and the housing sections are interconnected by inverted sheet metal channel members that correspond to the plastic pipe couplings. Thus both the pipeline and its protective housing may be extended indefinitely by 10 foot increments.

The downwardly extending side webs of the housing sections converge for supporting engagement with the underside of the plastic pipe and form a narrowed longitudinal slot, the slot clearing downwardly extending branches of the plastic pipe that carry the individual drinking cups. Thus a section of the pipe with its pendent watering cups may be easily slid lengthwise into a corresponding housing section.

The housing sections are supported by hangers which, in turn, are supported from above by cables and in the preferred practice of the invention, a winch and cable system makes it possible to raise and lower a long run of the watering system as a single unit. Thus minimum time and effort are required for periodic changes in the elevation of the water cups as the birds mature. Each hanger serves a dual purpose in that it not only hooks under a housing section to support the housing section but also confines the two side webs of the housing section to keep them from spreading apart and thus releasing the plastic pipe.

With reference to sanitation, one feature of the invention is that the watering cups are directly below the sheet metal housing to be protected from above by the housing. In addition, the pipe itself is enclosed by the housing. As for the housing itself, it has a smooth corrosion-resistant surface that may be readily cleaned or dusted whenever desired.

Another feature is the concept of providing a "hot" line or electrically charged conductor just above the housing to keep the birds from perching on the housing. Suitable snap-on insulators are quickly attachable to the housing sections to hold the charged conductor in correct position and are designed for quick engagement with the cable.

With the drinking cups mounted on downwardly extending branches of the pipeline, the pipeline itself is elevated well above the heads of the birds. Consequently floor area is free from any crevices created by the pipeline that would tend to trap food or foreign particles and with the pipeline up out of the way and with the water cups elevated, the floor area is unencumbered for maximum freedom of movement by the birds.

The preferred practice of the invention is further characterized by the concept of incorporating into each coupling a suitable plastic valve that not only is reliable and easy to operate but also provides convenient visual indication of whether the valve is open or closed. With the plastic valves spaced 10 feet apart, it is a simple matter to isolate any 10 foot pipe section for repair and replacement of drinking cups. With all of the valves closed, the valves may be opened in sequence along the length of the pipeline to supply water to the pipeline section by section for a quick check on the working condition of all of the drinking cups.

The features and advantages of the invention may be understood from the following detailed description together with the accompanying drawings.

BRIEF DESCRIPTION OF THE DRAWINGS

In the drawings, which are to be regarded as merely illustrative:

FIG. 1 is a fragmentary perspective view, partly broken away, showing a pipeline embodying a preferred practice of the invention;

FIG. 2 is a fragmentary side elevation of a portion of the pipeline on a larger scale with parts broken away;

FIG. 3 is a sectional view showing how a hanger engages the pipeline housing;

FIG. 4 is an elevational view showing how an insulator is mounted in an aperture in the top housing wall;

FIG. 5 is an elevational view partly broken away showing a plastic coupling in the pipeline with a valve incorporated in the coupling, the valve being in closed position;

FIG. 6 is a transverse section along the angular line 6 — 6 of FIG 5;

FIG. 7 is a fragmentary view similar to FIG. 6 showing the valve in open position; and FIG. 8 is a view similar to FIG. 6 showing the valve rotated 90° for release from a latch shoulder.

DESCRIPTION OF THE PREFERRED EMBODIMENT OF THE INVENTION

FIGS. 1 and 2 show a watering system comprising a pipeline made up of 10 foot sections 20 of PVC tubing protected by a housing assembly made up of ten foot housing sections 22. The pipe sections 20 are interconnected by couplings, generally designated 24, each of which incorporates a valve 25 and the housing sections 22 are interconnected by connecting members 26 which correspond to the pipe couplings.

The pipeline may be several hundred feet long and may be connected at either one end or at an intermediate point to an elevated water tank (not shown) by means of a flexible hose 28 which permits the pipe line to be adjusted in elevation relative to he floor and also permits the tank to be changed in elevation relative to the pipeline to vary the pressure in the pipeline. In the construction shown, one end of the pipeline is provided with an elbow 30 which is connected to a valve 24, the valve in turn being connected to the flexible hose.

Each pipe section 20 has a series of downwardly extending branches 34 which carry at their lower ends corresponding drinking cups 35 of a well known construction which supply water in response to pecks by the fowls. The branches 34 may also be made of PVC plastic and, in a well known manner, each branch 34 has a reduced upper end 36 (FIG. 3) which extends into the interior of the pipe section and each of the branches also has an integral cradle portion 38 (Figs. 2 and 3) which fits against the under surface of the pipe and is suitably bonded to the pipe, for example by sonic welding.

As best shown in FIG. 5, each of the couplings 24 has two opposite nipple portions 40 which telescope into the ends of the corresponding pipe sections 20 and each of the nipple portions is formed with a circumferential groove 42 which seats a suitable O-ring 44 for sealing the joint. The valve 25 in each coupling is operated by a push-pull handle 45 which is the outer end of a valve member 46 and which is pushed in as shown in FIG. 5 to close the valve and is pulled out as shown in FIG. 7 to open the valve. The valve member 46 and its handle 45 are preferably of a different color from the coupling to make the parts distinctive so that a mere glance is all that is needed to ascertain whether the valve is open or closed.

Each housing section 22 is a galvanized sheet metal member of the cross-sectional configuration of an inverted channel, each housing section having a top wall 48 (FIG. 3) and two downwardly extending side webs 50 which are offset inwardly towards each other as indicated at 52. The confronting offset portions 52 form a seat for the cradle portions 38 of the pipe sections 20 and the lower edges of the two side webs form a longitudinal slot 52 through which the pipe branches 34 extend, the slot being substantially narrower than the pipe 20. The previously mentioned housing connecting members 26 are also inverted channel members made of galvanized sheet metal, each connecting member overlapping the ends of the two corresponding housing sections 22 and being suitably connected thereto. In the construction shown, each end of each connecting member 26 is connected to the corresponding housing section 22 by a transverse cotter pin 54 which extends through aligned apertures of the connecting member and the housing section respectively.

The body of each of the previously mentioned valves 25 has an upwardly extending enlargement 55 and each of the housing connector members 26 has an opening 56 (FIG. 2) in its top wall that receives the valve enlargement and thus prevents rotation of the valve out of its normal downwardly extending position. 68.

Each of the housing sections 22 is supported by a heavy wire hanger 58 which, in turn, is supported from above by a cable 60 which may be adjusted to raise and lower the pipeline assembly as a unit. For this purpose, each of the upwardly extending cables 60 passes over an overhead pulley 62 and is connected to a main cable 64 that extends along the length of the whole pipeline assembly. Each of the pulleys 62 is supported from above by a short cable 65. One end of the main cable 64 is connected to fixed structure, for example a post 66, at one end of the pipeline assembly and the other end of the main cable is connected to a pulley 68.

A post 70 or similar fixed structure near the second end of the pipeline carries a winch 72 that is operable by a crank 74. A control cable 75 is wound on the winch and extends upwardly therefrom to pass around a pulley 76 and around the previously mentioned pulley 68, the upper end of the control cable being anchored to the post 70 by a bracket 78. The fixed pulley 76 is connected to the post by a similar bracket 80. It is apparent that the control cable 75 may be manipulated by the winch 72 to raise and lower all of the hangers 58 simultaneously. A suitable pawl-and-ratchet mechanism (not shown) may be used to releasably immobilize the winch 72 at selected adjustments of the control cable 75.

It may be noted that the various drinking cups 35 are directly under the housing sections 22 for protection by the housing sections against falling particles. It is further contemplated that birds will be prevented from perching on the housing sections 22. For this purpose, an electric conductor in the form of a metal cable 82 is mounted on the upper side of the housing assembly and is electrically charged in the well known manner.

In the construction shown the two opposite ends of the conductor 82 are connected to metal hooks 84 of two end insulators 85 made of suitable plastic material. Each end insulator 85 has a base portion that straddles the corresponding housing section 22 and is anchored to the housing section by a transverse cotter pin 86. In the construction shown, coil springs 88 are provided at the opposite ends of the conductor 82 to keep the conductor under tension.

Since the charged conductor 82 may be several hundred feet long, it is supported at intermediate points by intermediate insulators 90. Each of the intermediate insulators 90 has a pair of oppositely directed hook portions 92 to engage the conductor 82, and as best shown in FIG. 4, each of the insulators is mounted in an aperture 94 in the top wall 48 of the corresponding housing section 22.

Each of the intermediate insulators 90 is made of a resilient plastic and is provided with a slot 95 in its base portion to permit the intermediate insulator to be manually contracted for snap engagement with the housing section. The base portion of the intermediate insulator 90 has a relatively wide flange 96 that engages the upper surface of the top housing wall 48 and each of the intermediate insulators is further provided with a narrower lower flange 98 to engage the under surface of the top wall.

The construction of each of the valves 25 may be understood by referring to FIGS. 5 to 8. As shown in FIG. 7, each valve has an inlet passage 100 and an outlet passage 102 with a valve chamber 104 between the two passages. The valve chamber 104 is formed by the previously mentioned enlargement 55 of the valve. The valve structure further includes a wall that forms a transverse cylinder 105 in diametrical alignment with the chamber 104, approximately half of the length of the cylinder being inside the valve with the remaining portion extending outside of the valve.

Both ends of the cylinder 105 are open and, as may be seen in FIG. 7, the inner end of the cylinder extends into the chamber 104. The cylinder 105 intersects the inlet passage 100 but has a radial port 106 (FIG. 5) that registers with the inlet passage. Thus when the valve is open, flow from the inlet passage 100 is into the cylinder 105 through the port 106 of the cylinder and out of the inner end of the cylinder through the chamber 104 to the outlet passage 102.

The previously mentioned valve member 46 is slidingly mounted in the cylinder 105 for movement between the closed position shown in FIG. 5 and the open position shown in FIG. 7. At the closed position of the valve member 46, the valve member extends across the port 106 to block off the inlet passage 100 and an O-ring 108 in a circumferential groove 110 at the inner end of the valve member prevents leakage into the chamber 104 while a second O-ring 112 in a circumferential groove 114 of the valve member cuts off leakage to the outer end of the cylinder 105. At the retracted open position shown in FIG. 7, the port 106 is unmasked to permit flow through the valve and the second O-ring 112 still serves its purpose of preventing leakage through the outer end of the cylinder.

Any suitable means may be provided to latch the valve member 46 at at least one of its two positions. In this embodiment of the invention the latch means includes a resilient plastic latch arm 115 that is integral with the handle 45 and extends longitudinally along the outer surface of the exposed portion of the cylinder 105. At the closed position of the valve shown in FIG. 5, a latching notch 116 of the latch arm 115 straddles a radial flange 118 of the cylinder 105, the flange providing a latching shoulder 120 for engagement by one side of the notch to keep the valve member from being moved to its alternate open position.

The leading end of the latch arm 115 has a finger piece 122 to facilitate manipulation of the latch arm and the leading end is further formed with a cam surface 124 that leads to the latching notch. On the other side of the latching notch 116, the latching arm is provided with a second cam surface 125. As may be seen in FIGS. 6 and 8, the radial flange 118 is relatively short measured circumferentially of the cylinder 105.

The outer end of the cylinder 105 is provided with a radial flange 126 that forms an inwardly facing latch shoulder 128. When the valve member 46 is in its open position the latching notch 116 straddles the end flange 126 with one side of the notch cooperating with the shoulder 128 to limit the outward retraction of the valve member.

Preferably the valve member 46 is further provided with a second longitudinal latch arm 130 which has a latch shoulder 132 capable of cooperating either with the latch shoulder 120 of the radial flange 118 or with the latch shoulder 128 of the radial flange 126. The leading end of the second latch arm 130 has a cam surface 134 that leads to the latch to the latch shoulder 132.

When the valve member 46 is in its closed position shown in FIG. 5 with either one of the latch arms 115, 130 in engagement with the radial flange 118, the valve member may be unlatched by simply rotating the valve member to move the engaging latch arm circumferentially away from the short latch flange 118. The valve member 46 may then be pulled to its full open position. As the valve member approaches its full open position, the cam surface 125 rides over the end flange 126 whereupon the latch notch 116 snaps into engagement with the latch flange. It is to be noted that the latch shoulder 132 of the second latch arm 130 functions as a stop shoulder in cooperation with the end flange 126 to limit the outward movement of the valve member.

To return the valve member 46 to its closed position from the position shown in FIGS. 7 and 8, it is merely necessary to push the valve member axially inwardly and then rotate the valve member approximately 90° to bring one of the two latch arms into engagement with the radial flange 118. If it so happens that one of the two latch arms is in the sector of the radial flange 118 when the valve member is moved to its closed position, the leading cam surface of the latch arm will simply ride over the radial flange to permit the latch arm to snap into engagement with the radial flange. The two cam surfaces 124 and 134 on the outer ends of the two latch arms 115 and 130 respectively, make it a simple matter to assemble the valve member 46 to the valve by inserting the valve member into the cylinder 105 and then exerting axial force in the valve member to cause the two latch arms to snap over the end flange 126.

The provision of two diametrically opposite resilient latch arms which press inwardly against opposite sides of the cylinder 105 has a stabilizing effect on the valve member in that the radial inward pressures of the two latch arms balance each other. A second advantage of providing two diametrically opposite latch arms is that when the valve member is in its closed position with one of the latch arms in engagement with the radial flange 118 as shown in FIGS. 5 and 6, only 90° of rotation of the valve member suffices to position the two latch arms free from the radial shoulder 118.

My description of the selected embodiment of the invention in specific detail will suggest various changes, substitutions and other departures from my disclosure within the spirit and scope of the invention.

We claim:

1. In a pipeline assembly for supplying water to poultry or the like the combination of:
   a pipeline made up of interconnected pipe sections having spaced downwardly extending branches with water dispensing devices thereon;
   a series of housing sections along the pipeline for support thereof,
   each housing section enclosing the pipe and supporting the pipe;
   each housing section having a bottom slot of less width than the pipe for downward extension of said branches of the pipe sections therethrough,
   whereby the pipe sections with their branches may be inserted endwise into the housing sections; and
   means to support the housing sections at spaced points thereof to hold the pipeline elevated above floor level,
   the successive pipe sections of each successive pair of pipe sections being interconnected by a pipe coupling and a valve being incorporated in each pipe coupling to cut off flow through the pipeline past the pipe coupling.

2. A combination as set forth in claim 1 which includes electrically energized conductor means extending along the series of housing sections; and which includes spaced insulators mounted on the housing sections to support the conductor means in a position to prevent fowls from perching on the housing sections.

3. A combination as set forth in claim 2 in which the housing sections have apertures to receive the insulators and the insulators are resiliently contractable for snap engagement with the edges of the apertures.

4. A combination as set forth in claim 2 which includes insulating means for anchorage of the opposite ends of the conductor means and which includes coil spring means to place the conductor means under tension.

5. A combination as set forth in claim 1 in which the means to support the housing sections includes hangers in engagement with the sections at spaced points and adjustable means to support the hangers from above.

6. A combination as set forth in claim 1 in which the means to support the housing sections at spaced points includes a series of upwardly extending cable-like members at the spaced points and includes means to raise and lower said cable-like members simultaneously.

7. A combination as set forth in claim 1 which includes connecting members to interconnect the pairs of successive housing sections, said connecting members corresponding to said pipe couplings with the combined length of a housing section and a connecting member substantially equal to the combined length of a pipe section and a pipe coupling.

8. A combination as set forth in claim 7 in which each of said housing sections is an inverted channel member;
   in which each of said connector members is an inverted channel member;
   in which said channel members overlap at their junctures;
   in which the overlapping ends of the channel members have aligned apertures; and
   in which fastener members removably extend through the aligned apertures to interconnect the channel members.

9. A combination as set forth in claim 1 in which each of said valve-equipped couplings has two oppositely directed nipple portions for telescoping engagement with the ends of the corresponding pipe sections and includes elastomeric rings to seal the junctures of the nipple portions with the pipe sections.

10. A combination as set forth in claim 1 in which each of said valve-equipped couplings includes a valve member positioned laterally of the coupling and extending to the exterior thereof for manual operation,
    said valve member being embraced by sealing means and being retractable outward from a closed position to an open position.

11. A combination as set forth in claim 10 which includes manual operable means to latch said valve member at at least one of its two positions.

12. A combination as set forth in claim 10 which includes means to releasably latch the valve member at its two positions selectively.

13. A combination as set forth in claim 12 in which the valve member is made of plastic and the latch means comprises at least one flexible plastic latch arm integral with the valve member and cooperative with latch shoulders on the exterior of said cylindrical portion.

14. A Combination as set forth in claim 1 in which each of said housing sections is an inverted channel member;
    in which each of said connector members is an inverted channel member;
    in which said channel members overlap at their junctions; in which the overlapping ends of the channel members have aligned apertures;
    in which fastener members removably extend through the aligned apertures to interconnect the channel members; and
    in which the members interconnecting the successive housing sections engage the corresponding pipe couplings to prevent rotation thereof and thereby prevent rotation of said valves.

15. A combination as set forth in claim 1 in which said coupling includes:

walls forming an inlet passage and an outlet passage;
a wall forming a cylinder having its inner end in communication with the outlet passage and having its outer end opening onto the exterior of the valve,
said cylinder extending across said inlet passage; and
a valve member slidingly mounted in said cylinder for movement between an inner closed position closing said side port to cut off the inlet passage and an outer open position uncovering the side port to permit fluid flow from the inlet passage through the side port into the cylinder and out of the inner end of the cylinder into the outlet passage.

16. A combination as set forth in claim 15 in which said cylindrical portion has an outer circumferential shoulder near its outer end for engagement by said latch arm at the open position of the valve and has a second external shoulder spaced axially inwardly from the first shoulder for engagement by the latch arm at the closed position of the valve,
said second shoulder having a circumferential extent of less than 360° and said valve member being rotatable to shift said latch arm out of engagement with said second shoulder.

17. A combination as set forth in claim 1 in which each of said housing sections is a sheet metal member of the general cross-sectional configuration of an inverted channel,
the housing section having a top web and two downwardly extending side webs,
and in which said side webs are turned towards each other to define a longitudinal bottom slot to clear said branches of the pipe and to form a seat for supporting the pipe.

18. A combination as set forth in claim 17 in which said means to support the housing sections includes hangers to engage the housing sections at said spaced points,
each of said hangers having a hook portion engaging the corresponding housing section from below, said hook portion being shaped and dimensioned to confine said side webs to limit spreading of the side webs.

19. In a pipeline for supplying water to poultry or the like, the combination of:
a series of plastic pipe sections positioned end to end,
each of said pipe sections having spaced water dispensing devices thereon;
a series of plastic pipe couplings dimensioned for telescoping connection with the ends of said pipe sections to interconnect the successive pipe sections;
elastomeric sealing rings to seal the telescopic junctures of the pipe sections and couplings;
plastic valves incorporated in at least some of said plastic couplings to control flow therethrough, each of said valves being a push-pull valve; and
means to support the series of pipe sections with said drinking devices spaced above floor level.

20. A combination as set forth in claim 19 in which said valve comprises:
walls forming an inlet passage and an outlet passage;
a wall forming a cylinder having its inner end in communication with the outlet passage and having its outer end opening onto the exterior of the valve,
said cylinder extending across said inlet passage and having a side port in communication with the inlet passage; and
a valve member slidingly mounted in said cylinder for movement between an inner closed position closing said side port to cut off the inlet passage and an outer open position uncovering the side port to permit fluid flow from the inlet passage through the side port into the cylinder and out of the inner end of the cylinder into the outlet passage.

21. A combination as set forth in claim 20 which includes O-ring means embracing said valve member to cut off leakage through the inner end of the cylinder at the closed position of the valve and to cut off leakage at the outer end of the cylinder at both positions of the valve member.

22. In a pipeline equipped with drinking cups for supplying water to poultry in a chamber providing an overhead support, the improvement to give the birds maximum freedom of movement on the floor space and to keep the pipeline from cooperating with the floor to trap feed particles and foreign material, comprising:
first means extending from the overhead support for maintaining the pipeline in elevated relationship from the floor and in suspended relationship from the overhead support to eliminate the need for pipe-supporting structure at the floor level,
branches extending downwardly from the pipeline at spaced intervals along the length of the pipeline,
drinking cups mounted on the branches at the lower ends of the branches at levels above the floor to prevent the birds from fouling either the pipeline or the drinking cups,
second means operatively associated with the first means for providing adjustments in the level of the pipeline to a sufficiently high level to prevent the drinking cups from being fouled by the birds and to provide for free movement of the birds under the pipeline, and
means cooperative with the pipeline at spaced positions along the pipeline for providing individual controls over the flow of water past each of such spaced positions.

23. An improvement as set forth in claim 22 which includes an electrically charged conductor means disposed above the pipeline to prevent the birds from perching on the elevated pipeline.

24. An improvement as set forth in claim 22 in which the pipeline is enclosed by a longitudinal housing with the branches of the pipeline extending downward from the housing, the housing having a relatively smooth and substantially noncorrosive surface to make it easy to clean.

25. An improvement as set forth in claim 24 which includes electrically charged conductor means extending along the housing longitudinally thereof at a position above the housing to keep the birds from perching on the housing.

26. An improvement as set forth in claim 22 wherein the first means includes adjustable means to vary the height of the pipeline to permit the drinking cups to be progressively elevated as the birds mature and further includes hangars extending around the housing at the bottom of the housing, at spaced positions along the housing, and coupled to the first means for maintaining the pipeline in suspended relationship from the overhead support.

27. An improvement as set forth in claim 26 wherein the longitudinal housing has side walls shaped to support the pipeline and shield the pipeline from the birds.

28. An improvement as set forth in claim 22 wherein hollow extension means are disposed in the pipeline for controlling the flow of fluid through the pipeline and wherein valve means are slidingly mounted in the hollow extension means for movement between first and second positions and wherein the valve means cooperate with the hollow extension means in the first position of the valve means to prevent the flow of fluid through the pipeline and wherein the valve means provide for the flow of fluid through the pipeline in the second position of the valve means.

29. An improvement as set forth in claim 22, including,
a hollow extension having a side port in communication with the pipeline to provide for a flow of fluid through one side of the pipeline and the side port to the other side of the pipeline, and
a valve member slidingly mounted in the valve extension for movement between a first position closing the side port against the flow of water through the pipeline and a second position opening the side port for the flow of water through the pipeline.

30. An improvement as set forth in claim 29 wherein latch means are provided on the hollow extension and means are provided on the valve member for cooperating with the latch means on the hollow extension to latch the valve member to the hollow extension in at least one of the first and second positions of the valve member.

31. An improvement as set forth in claim 30 wherein the means on the valve member for cooperating with the means on the hollow extension extend outwardly from the valve member to serve as a handle for manual movement of the valve member between the first and second positions.

32. An improvement as set forth in claim 30 wherein the means on the valve member for cooperating with the means on the hollow extension extend outwardly from the valve member at a pair of spaced positions on the valve member to serve as handles for manual movement of the valve member between the first and second positions and wherein the outwardly extending means on the valve member press inwardly against the hollow extension to stabilize the valve member relative to the hollow extension.

33. An improvement as set forth in claim 32 wherein the first means include hangars extending around the housing at the bottom of the housing, at spaced positions along the housing, and coupled to the first means for maintaining the pipeline in suspended relationship from the overhead support.

34. An improvement as set forth in claim 22, including,
the pipeline including a series of pipe sections and a series of pipe couplings dimensioned for telescoping junctures with the pipe sections to interconnect the successive pipe sections,
elastomeric sealing rings to seal the telescopic junctures of the pipe sections and couplings, and
valves incorporated in at least some of the plastic couplings to control the flow of water through the pipe sections.

35. An improvement as set forth in claim 22 wherein the valves are push-pull valves.

36. An improvement as set forth in claim 35 wherein electrically charged conductor means extend along the housing at a position above the housing to inhibit the birds from perching on the housing and wherein the housing has side walls shaped to support the pipeline and shield the pipeline from the birds.

* * * * *